Jan. 10, 1967 T. R. BROGAN 3,297,890
METHOD OF AND APPARATUS FOR PRODUCING HIGH
ENERGY ELECTRICAL IMPULSES
Filed Nov. 1, 1963

THOMAS R. BROGAN
INVENTOR.

BY Alden D. Redfield
Melvin E. Frederick
ATTORNEYS

United States Patent Office 3,297,890
Patented Jan. 10, 1967

3,297,890
METHOD OF AND APPARATUS FOR PRODUCING HIGH ENERGY ELECTRICAL IMPULSES
Thomas R. Brogan, Arlington, Mass., assignor to Avco Corporation, Cincinnati, Ohio, a corporation of Delaware
Filed Nov. 1, 1963, Ser. No. 320,817
17 Claims. (Cl. 310—11)

The present invention relates to the production of high energy electrical impulses and more particularly to the production of such impulses with a magnetohydrodynamic (hereinafter abbreviated "MHD") generator.

MHD generators produce electric power by movement of electrically conductive fluid or plasma relative to a magnetic field. The fluid employed is usually an electrically conductive gas from a high temperature, high pressure source. From the source, the fluid flows through the generator and by virtue of its movement relative to the magnetic field, induces an electromotive force between opposed electrodes within the generator. The gas comprising the fluid may exhaust to a sink, which may simply be the atmosphere; or, in more sophisticated systems, the gas may exhaust to a recovery system including pumping means for returning the gas to the source. Conductivity of the gas may be produced thermally and/or by seeding with a substance that ionizes readily at the operating temperature of the generator. For seeding purposes, potassium and cesium or their salts may be used. Regardless of the gas used, or the manner of seeding, the resulting gases comprise a mixture of electrons, positive ions, and neutral atoms which, for convenience, is termed "plasma."

An MHD generator of the type described normally employs a stationary magnetic field and unidirectional gas flow. As a result, such a generator is inherently a source of direct current. If alternating current is desired, some form of auxiliary equipment is usually provided to invert the direct current to alternating current.

In accordance with the present invention, a load in series with a rectifier is connected across a pair of opposed electrodes of an MHD generator and an inductor is connected in parallel across the serially connected load and rectifier. The inductor may be the magnet of the generator, it may be entirely separate and distinct therefrom, or be combined with the magnet. During build-up and steady operation of the generator, no current flows through the load due to the fact that the rectifier is connected such that the polarity across it does not permit this. When the flow in the generator is turned off, the generator becomes a very high impedance. However, the current in the inductor cannot be changed instantly. Therefore, the polarity across the inductor reverses and assumes a magnitude which tends to maintain constant current in the inductor. With this reversal of polarity, current from the inductor now flows through the rectifier and the load. The load resistance is made much larger than the resistance of the magnet. In this way, the dissipation in the magnet is small compared to the rate at which energy is delivered to the load. When the inductor has been fully charged, the flow of fuel to the generator, for example, is shut off but the flow of air or oxidizer is not changed. Since no current or very little current now flows in the generator and since the resistance of the load is much greater than the resistance of the inductor, the voltage across the inductor, generator and load will be equal to the voltage across the load since the current in the inductor cannot be changed instantaneously. The fact that a normal design for MHD generators yields energy storage in the inductor of several times the output of the generator in one second makes it possible to deliver energy to the inductor at nearly the rate of output of the generator and to pulse the generator in times short compared to a second and to repeat the cycle at intervals of approximately one second. When the flow of fuel to the generator is cut off, the generator acts as an air blast circuit breaker when the flame is extinguished momentarily, and consequently, the generator is able to withstand very high voltages and permits short discharge times. In order to deliver repetitive impulses, the flame in the combustion chamber of the generator is extinguished for a time approximately equal to the pulse duration. The impulse is delivered to the load after which time the generator is reignited to recharge the inductor and the process continued.

It is therefore a principle object of the present invention to provide a method of and apparatus for the production of high energy electrical impulses with an MHD generator.

It is another object of the invention to provide at a cost not appreciably in excess of the cost of a conventional MHD generator simultaneous generation, storage, and delivery of high level single or repeated electrical impulses.

A further object of the present invention is the utilization of an MHD generator as a switch for the production of high energy electrical impulses.

A still further object of the present invention is the combination of the functions of energy generation, storage, and delivery of electrical impulses in a single unit substantially identical with an MHD generator.

The novel features that are considered characteristic of the present invention are set forth in the appended claims; the invention itself, however, both as to its organization and method of operation, together with additional objects and advantages thereof, will best be understood from the following description of the specific embodiment when read in conjunction with the accompanying drawings, in which:

Figure 1:
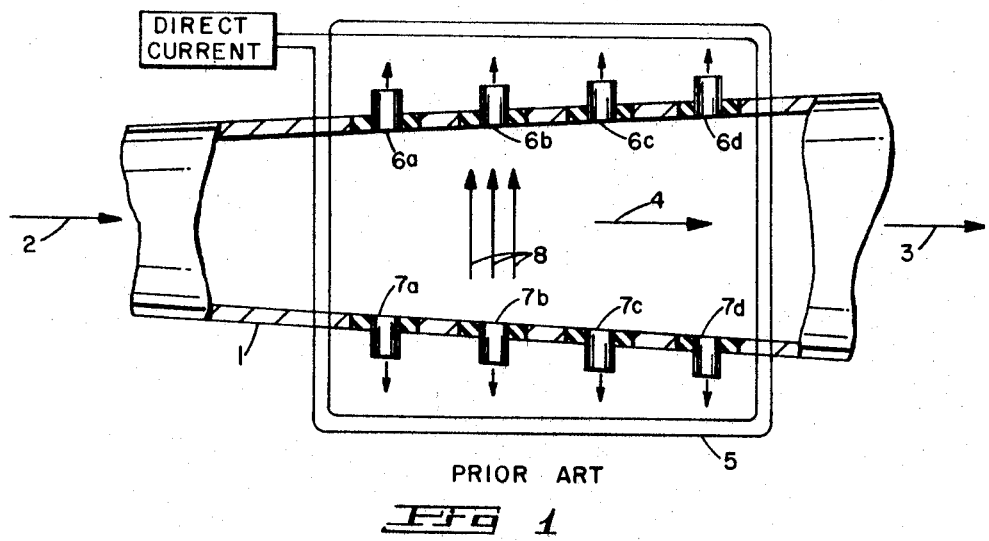
FIGURE 1 is a simplified diagrammatic illustration of an MHD generator.

A knowledge of the general principles of MHD devices will promote an understanding of the present invention. For this reason and by way of example, there is shown in FIGURE 1 a schematic diagram of an MHD generator. As illustrated in this figure, the generator comprises a tapered duct, generally designated 1, to which high temperature, high pressure, electrically conductive plasma is introduced, as indicated by the arrow at 2, and from which it exhausts, as indicated by the arrow at 3. The pressure at the exit of the duct is lower than at its inlet; and for this reason, the plasma moves at high velocity through the duct, as indicated by the arrow at 4. By properly choosing the pressure differential and shape of the duct, the plasma can be made to move through the duct at substantially constant velocity, which is desirable although not necessary to the operation of the generator. Surrounding the exterior of the duct is a continuous electrical conductor in the form of a coil or inductor 5 to which direct current may be supplied from any conventional source or from the generator itself. Flow of electrical current through the inductor 5 establishes a magnetic flux through the duct 1 perpendicular to the direction of plasma flow 4 and the plane of the paper.

Within the duct are provided opposed electrodes $6a$–$6d$ and $7a$–$7d$. These electrodes may extend along the interior of the duct parallel to the dominant direction of plasma movement and may be positioned opposite one another in planes perpendicular to the direction of plasma movement and parallel to the direction of magnetic flux. High velocity movement of the electrically conductive plasma through the magnetic field induces a unidirectional electromotive force between the electrodes, as indicated by the arrows at 8. Opposed pairs of the electrodes $6a$–$6d$ and $7a$–$7d$ may be connected by conductors to a load or loads (not shown) through which electrical current flows under the influence of the aforementioned unidirectional electromotive force. By way of example, the opposed pair of electrodes 6a and 7a may supply current having a predetermined direction to the inductor 5 and electrodes 6b and 7b, 6c and 7c, or 6d and 7d may supply current to a further inductor, inverter or the like as may be required or desired.

Figure 2:
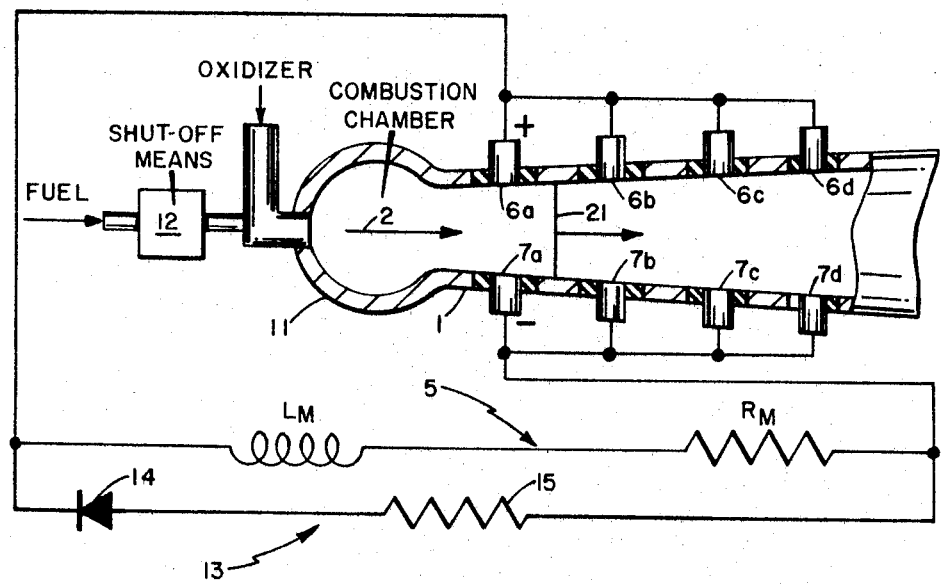
FIGURE 2 is a simplified diagrammatic illustration of an MHD generator and the electrical circuit for the magnet thereof in accordance with the present invention.

Directing attention now to FIGURE 2, there is shown a combustion chamber 11 and fuel supply means including a source of fuel, a source of oxidizer or combustion supporting medium, and conventional shut-off means 12 in the fuel supply for generating the plasma 2 and supplying it to the duct 1. To facilitate the discussion of the invention, the inductance of the inductor 5 is represented by the inductances $L_M$ in series with the resistance of the inductor 5 represented by the resistance $R_M$. The inductor 5 is connected across electrodes 6a–6d and 7a–7d. A load circuit designated generally by the numeral 13, comprising unidirectional conducting means, such as for example a rectifier 14 in series with a load 15, is connected across the inductor 5. Thus, the magnet (inductor 5) and the load circuit are connected in parallel across electrodes 6a–6d and 7a–7d.

The polarity at the electrodes is designated by respectively the plus and minus signs adjacent these electrodes. Accordingly, current from these electrodes has a predetermined direction and flows through the inductor 5. The rectifier 14 is polarized to present a low impedance to current having an opposite direction. Thus, when the generator is supplying current to the inductor 5, the rectifier 14 prevents current flow through the load 15 but does not prevent current flow through the load 15 in the opposite direction.

The use of an inductor to supply the magnetic field requires in conventional manner a separate direct current source for start-up to provide sufficient magnetic field so that when plasma flows through the duct 1 the field will build up to the design value. Such a separate source as shown in FIGURE 1, for example, provides the residual field present in conventional rotating generators. Thus, during start-up when, for example, battery current to the magnet has reached an equilibrium value, plasma flow through the magnetic field causes the magnetic field to increase further as both the generator and the battery bank supply power to the magnet. At the same time that the field is increasing, the generator voltage is likewise increasing since the generator voltage is proportional to the strength of the magnetic field. Such a generator is in a self-exciting configuration, i.e., it is generating more power than that required by the magnet so that the field will continue to build up to the design value. When the generator output voltage reaches the open circuit voltage of the battery bank, the battery bank may be disconnected from the system. The particular manner in which the generator is started is not pertinent to the present invention.

Consider now what happens if the flow of plasma is cut off, or, which is the equivalent thereof, the electromotive force between the electrodes or the conductivity of the plasma is substantially reduced. The electromotive force is not reduced to zero because the gas velocity is not zero. As has been previously noted, during build up and steady operation of the generator, no current flows through the load because the polarity across the rectifier 14 will not permit it. However, when the flow of plasma is turned off, the impedance between the electrodes becomes very high. Since the current in an inductor cannot be changed instantly, the polarity across the inductor 5 reverses and assumes a magnitude sufficient to maintain constant current in the inductor 5. With the reversal of polarity, current now flows from the inductor 5 through the rectifier 14 and the load 15.

Assume now that the generator of FIGURE 2 is delivering rated power P to the inductor 5 at a voltage V and a current I, such that P is equal to VI. The power delivered to the inductor 5 is either dissipated in the inductor as a $I^2R$ loss or appears as a change in energy stored in the inductor. In normal or steady state operation, there is no change in stored energy in the inductor which supplied the magnetic field and energy supplied to the inductor is just enough to provide the dissipation at the design field strength which remains constant. If desired, any power developed by the generator, in addition to that required by the magnet, may be delivered to an external load or loads.

There are present day applications requiring high energy impulses (up to $10^{10}$ joules) to be delivered to a load in periods of several milliseconds. This may be accomplished in accordance with one embodiment of the present invention by delivering power developed by the generator to the inductor (inductive storage) over a relatively long period of time such as for example one second with as little energy dissipation in the inductor as possible and then supplying a portion of the energy stored in the inductor to a load in a time very short compared to the time energy is delivered to the inductor and repeating this process as many times as is desired.

It has been found that in MHD generators driven by combustion gases, the energy stored in the magnetic field of the generator is several times the energy output of the generator in one second. The present invention permits the discharge of a portion of the energy in, for example, the magnet of an MHD generator without decreasing the strength of the magnetic field of the generator to a point where the generator output would be markedly reduced so that after an impulse has been delivered to a load, the output of the generator may then be used to recharge the magnet very quickly. The fact that the normal design of an MHD generator yields energy storages of several times the output of the generator makes it possible to deliver energy to the inductor at the rated output of the generator and to pulse the generator in times short compared to a second and to repeat this cycle at intervals of approximately one second. Further, utilization of the generator both as a source of energy and as a switch eliminates prior art switching problems involved in delivering high energy impulses of short duration.

Referring now to FIGURE 2, the resistance $R_s$ of the load is preferably made much larger than the resistance $R_M$ of the inductor so that most of the energy stored in the inductor will be delivered to the load when the coil is discharged.

Assume now that the cycle begins when the inductor is fully charged and that the MHD generator acts as a perfect switch, i.e., no current flows in the generator between the electrodes. In this case, at the moment of switching, the voltage V across the inductor, generator and the load is equal to $IR_s$ where I is the current in the inductor and $R_s$ is the resistance of the load. The power input to the load is equal to the ratio $I^2R_s$. The time required to discharge into the load an energy equal to the power output of the generator is approximately inversely proportional to the ratio $R_M/R_s$. The discharge time of the inductor should be as short as possible, the minimum discharge time being determined by the voltage which can be withstood by the MHD generator duct which is now acting as a switch.

In order to deliver repetitive impulses, the flame in the combustion chamber of the generator may be extinguished for a time approximately equal to the duration of the impulse. The impulse of current thus provided is delivered to the load after which time the combustion chamber of the generator is reignited to recharge the magnet whereafter the process may be repeated.

The properties of MHD generators are such that at high output power levels, typically about 20 megawatts and higher, the generator will act as an air blast circuit breaker when the flame in the combustion chamber is extinguished momentarily. Consequently, the generator will be able to withstand very high voltages and permit short discharge times. Further, the performance of the MHD generator as a circuit breaker should improve as the size of the generator is increased, i.e., as the ratio of energy storage to power dissipation in the magnet. This ratio increases markedly as the power level of the generator is increased.

When the MHD generator is delivering rated power and the flow of fuel is cut off, a cold front, designated by the number 21 as shown in FIGURE 2, propagates down the duct 1 in the direction of plasma flow. Hot combustion gases which are good conductors of electricity are in front or downstream of this cold front and, compared to the hot combustion gases, cold gases which do not conduct electricity are behind or upstream of the cold front. In order for the generator to act as a circuit breaker, the hot conductive gases must be purged from the duct (at least at the electrodes supplying current to the inductor) by cold gases which do not conduct electricity. Purging is possible before the inductor voltage reverses and rises to a very high value because of the fact that in very large sized generators the aforementioned cold front will have propagated almost the entire length of the generator before the inductor reverses polarity. Stated differently, the polarity of the inductor will not reverse until the hot gases have been very nearly completely purged from the duct of the generator. In the case of a 20 megawatt generator now under construction, the reversal of polarity in the magnet is estimated to occur when the cold front is approximately 60% of the way down the duct. For a generator of 10,000 megawatts capacity, the reversal of polarity in the magnet may be postponed until the cold wave has traveled about 95% of the length of the duct. Accordingly, it will now be seen that the provision of a cold front in the duct of an MHD generator, as by cutting off the supply of fuel or otherwise, causes the generator to act as an excellent air blast circuit breaker which permits the system to be used to deliver repetitive impulses of extremely high energy and short duration without the attendant problems and difficulties associated with conventional switching apparatus.

In some cases, the energy stored in the magnet of the MHD generator may not be of the right magnitude for the application desired or the energy stored may be somewhat less than several times the generator output. Accordingly, a suitable inductor and load circuit as shown in FIGURE 2 may be connected as a separate circuit across electrodes 6a–7a, 6b–7b and 6c–7c. In this case, current for the magnet of the MHD generator may be supplied from a separate direct current source and/or separately from electrodes 6d–7d for example. Thus, the present invention may be used where an MHD generator is used to charge any conceivable combination of the generator magnet and any external additional inductor wherein the generator is used as a switch in the manner previously described. Further, it is possible to store all of the energy in an external inductor, use the generator as a switch, and not disturb the magnetic field in the generator. In this case, the generator magnet does not change current appreciably during the time that an impulse is delivered to the load because the ratio of the inductance to the resistance of the magnet is considerably less than one, but the energy stored in the external inductor is discharged. It should be noted that connection of the electrodes as shown in FIGURE 2 has the advantage of utilizing the total output of the generator but that this simultaneously permits the flow of Hall currents. Accordingly, in some applications, it may be desirable to utilize substantially less than all of the electrodes in supplying energy to the inductor which is connected in parallel with the load circuit.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:
1. In the method producing electrical impulses in a load in circuit with an inductor, the steps comprising:
   (a) passing a hot electrically conductive gas between a pair of opposed electrodes in a magnetic field in an MHD generator to generate electrical energy by inducing a unidirectional electromotive force between said electrodes;
   (b) inductively storing at least a part of said electrical energy by establishing flow of current in a predetermined direction from said electrodes through said inductor while preventing current having said direction from flowing through said load; and
   (c) suddenly releasing at least a part of said stored electrical energy to said load by suddenly reducing the electrical conductivity of said gas.

2. In the method of producing electrical impulses in a load in circuit with an inductor, the steps comprising:
   (a) passing a hot electrically conductive gas between a pair of opposed electrodes in a magnetic field in an MHD generator to generate electrical energy by inducing a unidirectional electromotive force between said electrodes;
   (b) inductively storing at least a part of said electrical energy by establishing flow of current in a predetermined direction from said electrodes through said inductor while simultaneously substantially completely preventing current having said direction from flowing through said load; and
   (c) suddenly releasing at least a part of said stored electrical energy to said load by suddenly substantially reducing the electrical conductivity of said gas.

3. The combination as defined in claim 2 wherein:
   (a) only a part of said energy stored in said inductor is released and the remainder supplies at least a part of the magnetic field in the MHD generator; and
   (b) the time said electrical conductivity is reduced is short compared to one second.

4. In the method of producing high energy electrical impulses in a load in circuit with an inductor, the steps comprising:
   (a) passing a hot electrically conductive gas between a pair of opposed electrodes in a magnetic field in an MHD generator to generate electrical energy by inducing a unidirectional electromotive force between said electrodes;
   (b) inductively storing at least a part of said electrical energy by establishing flow of current in a predetermined direction from said electrodes through said inductor while simultaneously substantially completely preventing current having said direction from flowing through said load; and
   (c) suddenly releasing at least a part of said stored electrical energy to said load by suddenly periodically substantially reducing the electrical conductivity of said gas.

5. In the method of producing high energy electrical impulses in a load in circuit with an inductor, the steps comprising:
   (a) passing a hot electrically conductive gas between a pair of opposed electrodes in a magnetic field in an MHD generator to generate electrical energy by inducing a unidirectional electromotive force between said electrodes;
   (b) inductively storing a least a part of said electrical energy by establishing flow of current in a predetermined direction from said electrodes through said inductor while simultaneously substantially completely preventing current having said direction from flowing through said load; and
   (c) suddenly releasing at least a part of said stored electrical energy to said load by suddenly substantially reducing the temperature of said gas.

6. In the method of producing high energy electrical impulses in a load in circuit with an inductor, the steps comprising:
 (a) passing a hot electrically conductive gas comprising products of combustion of a fuel and an oxidizer between a pair of opposed electrodes in a magnetic field in an MHD generator to generate electrical energy by inducing a unidirectional electromotive force between said elecrodes;
 (b) inductively storing at least a part of said electrical energy by establishing flow of current in a predetermined direction from said eletcrodes through said inductor while simultaneously substantially completely preventing current having said direction from flowing through said load; and
 (c) periodically suddenly releasing at least a part of said stored electrical energy to said load by suddenly periodically cutting off the flow of said fuel.

7. In the method of producing high energy electrical impulses in a load in circuit with an inductor, the steps comprising:
 (a) passing a hot electrically conductive gas between a pair of opposed electrodes in a magnetic field in an MHD generator to generate electrical energy by inducing a unidirectional electromotive force between said electrodes;
 (b) inductively storing at least a part of said electrical energy by establishing flow of current in a predetermined direction from said electrodes through said inductor while simultaneously substantially completely preventing current having said direction from flowing through said load; and
 (c) periodically suddenly releasing at least a part of said stored electrical energy to said load by suddenly periodically cutting off the flow of said oxidizer.

8. The combination as defined in claim 5 wherein the electrical conductivity of said gas is reduced for a time that is short compared to the time the electrical conductivity of said gas is not substantially reduced.

9. The combination as defined in claim 5 wherein the electrical conductivity of said gas is reduced for a time that is short compared to one second.

10. In apparatus for generating electrical impulses, the combination comprising:
 (a) MHD generating means for generating electrical current having a predetermined direction, a unidirectional electromotive force being induced between a pair of opposed electrodes in a magnetic field by passing a hot electrically conductive gas between said electrodes;
 (b) an inductor connected between said electrodes;
 (c) unidirection conducting means connected to one end of said inductor and presenting a high impedance to current having said predetermined direction; and
 (d) means for suddenly substantially reducing said electromotive force.

11. In apparatus for generating electrical impulses, the combination comprising:
 (a) MHD generating means for generating electrical current having a predetermined direction, a unidirectional electromotive force being induced between a pair of opposed electrodes in a magnetic field by passing a hot electrically conductive gas between said electrodes;
 (b) an inductor connected between said electrodes;
 (c) unidirection conducting means connected to one end of said inductor and presenting a high impedance to current having said predetermined direction; and
 (d) means for suddenly substantially reducing said electromotive force for a time that is short compared to one second.

12. In apparatus for generating electrical impulses, the combination comprising:
 (a) MHD generating means for generating electrical current having a predetermined direction, a unidirectional electromotive force being induced between a pair of opposed electrodes in a magnetic field by passing a hot electrically conductive gas between said electrodes;
 (b) an inductor connected between said electrodes;
 (c) unidirection conducting means connected to one end of said inductor and presenting a high impedance to current having said predetermined direction; and
 (d) means for periodically suddenly substantially reducing said electromotive force for a time that is short compared to one second.

13. In apparatus for generating high energy electrical impulses, the combination comprising:
 (a) MHD generating means for generating electrical current having a predetermined direction, a unidirectional electromotive force being induced between a pair of opposed electrodes in a magnetic field by passing a hot electrically conductive gas between said electrodes;
 (b) an inductor connected between said electrodes;
 (c) unidirection conducting means connected to one end of said inductor and presenting a high impedance to current having said predetermined direction; and
 (d) means for periodically, suddenly and substantially reducing the temperature of said gas.

14. The combination as defined in claim 13 wherein said gas includes products of combustion of constituents comprising a fuel and an oxidizer and said means for reducing the temperature of said gas includes means for cutting off the flow of one of the constituents of said gas.

15. The combination as defined in claim 14 wherein said inductor is arranged and disposed to supply at least in part the magnetic field of said MHD generating means.

16. The combination as defined in claim 14 wherein said inductor is separate from said MHD generating means.

17. In apparatus for generating high energy electrical impulses, the combination comprising:
 (a) MHD generating means for generating electrical current having a predetermined direction, a unidirectional electromotive force being induced between a pair of opposed electrodes in a magnetic field by passing a hot electrically conductive gas between said electrodes;
 (b) an inductor connected between said electrodes;
 (c) a load circuit connected across said inductor comprising unidirectional conducting means and a load, said unidirectional conducting means presenting a high impedance to current having said predetermined direction and said load having a resistance high compared to the resistance of said inductor; and
 (d) means for periodically suddenly substantially reducing said electromotive force for a time that is short compared to one second.

No references cited.

MILTON O. HIRSHFIELD, *Primary Examiner.*

D. X. SLINEY, *Assistant Examiner.*